Jan. 4, 1955 D. A. WHARTON 2,698,921
TESTING INSTRUMENT
Filed June 11, 1948 2 Sheets-Sheet 1
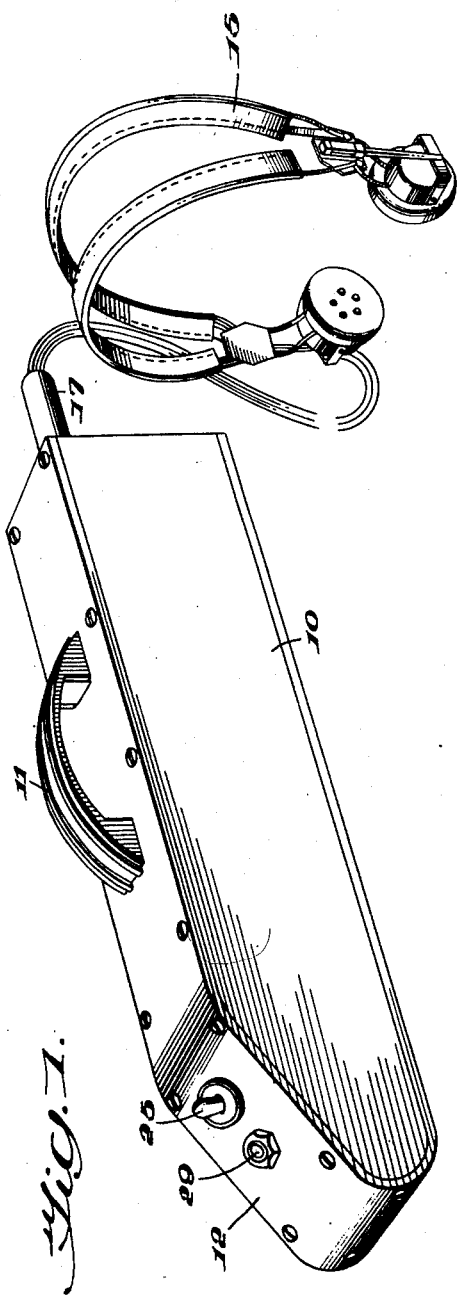
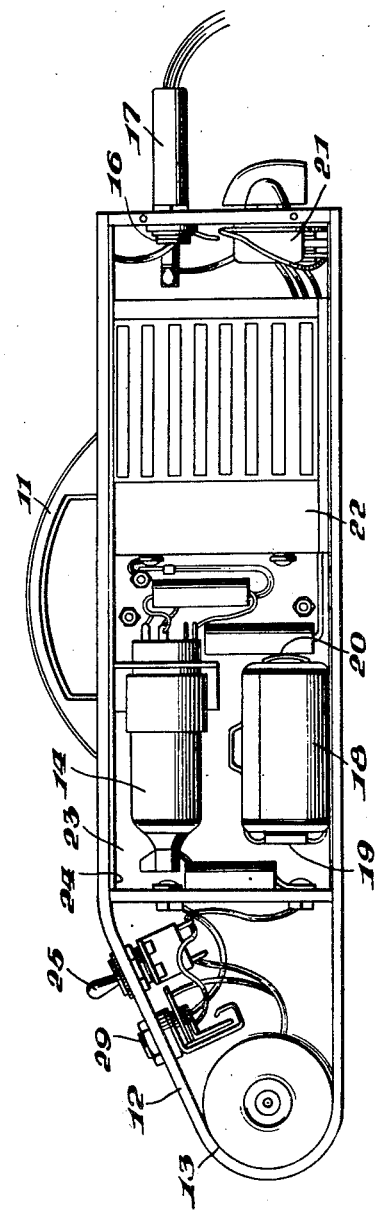
Inventor
DONALD A. WHARTON
By Perry & Miller
Attorneys Jan. 4, 1955  D. A. WHARTON  2,698,921
TESTING INSTRUMENT
Filed June 11, 1948  2 Sheets-Sheet 2
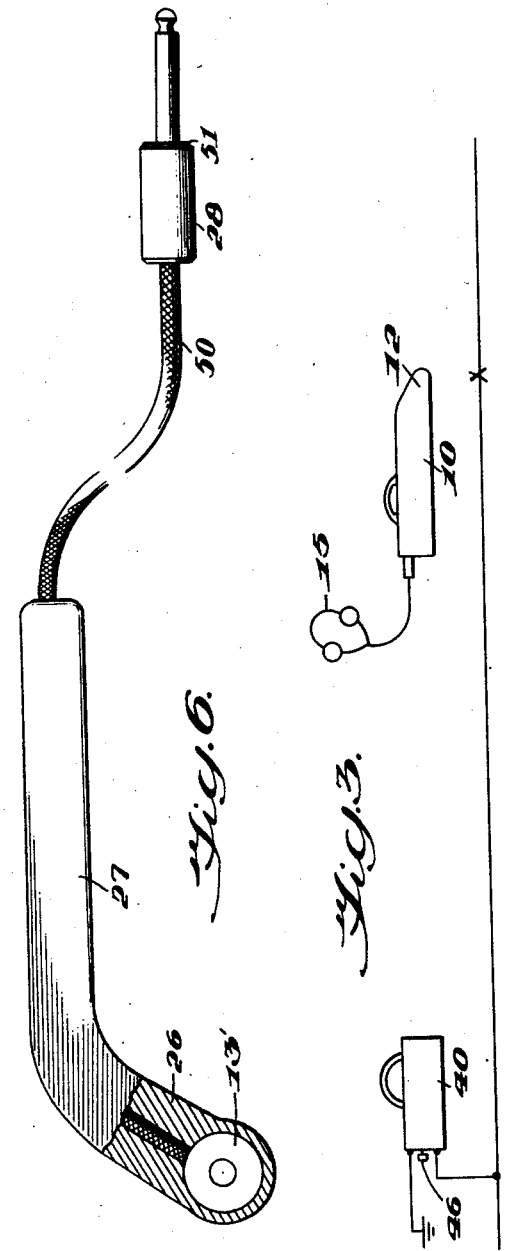
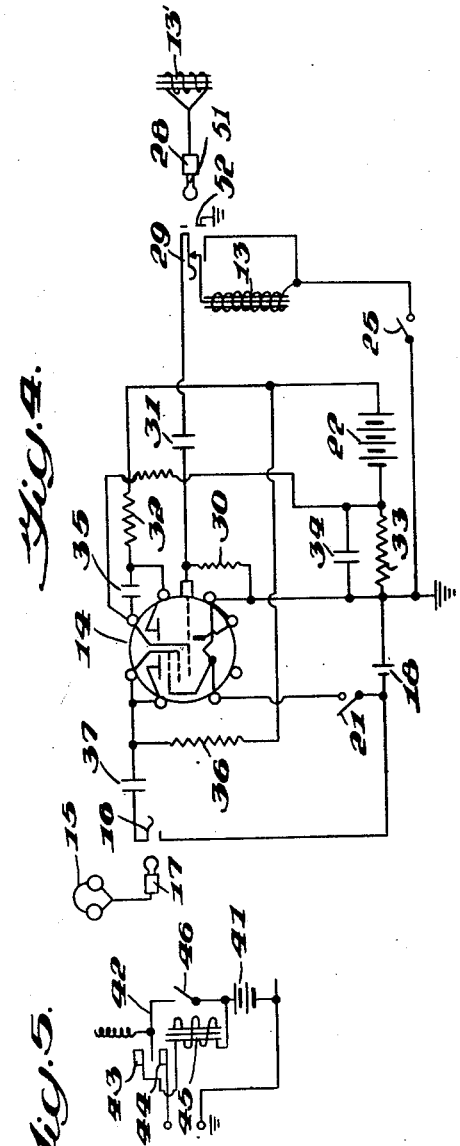
Inventor
DONALD A. WHARTON
By Parry & Miller
Attorneys

United States Patent Office 2,698,921
Patented Jan. 4, 1955

2,698,921

TESTING INSTRUMENT

Donald A. Wharton, Arlington, Va.

Application June 11, 1948, Serial No. 32,459

8 Claims. (Cl. 324—52)

The invention relates to electrical testing instruments for the detection of faults in electric lines and circuits of various types including lighting, telephone and telegraph wires and cables, automobile wiring, aircraft wiring, diesel electric wiring in rail, ship or stationary service, wiring in railroad coaches, electronic circuits and the like.

The invention is particularly directed to an improved electronic instrument of such type operating by detection of a field carried by the faulty electric wire under test to locate the point of fault. The invention provides a highly sensitive tester which will respond to relatively weak fields and which is so small and portable that it may be brought into immediate proximity with the line fault to exactly locate it where space conditions are limited. Because of its sensitivity it permits faults to be located with considerable exactness at a considerable distance from a faulty line and even when shielded therefrom by intervening metal.

The invention is of such character that it permits all operating parts to be housed in a very small and lightweight portable housing which may be easily carried along the faulty line under test. It operates entirely in dependency upon the filed of the particular line being tested and does not require the line to carry high voltage.

A further characterizing feature of the invention is that it is equally adapted to detection of grounds and short circuits in lines through detection of electromagnetic fields and the location of open faults in line through detection of electrostatic fields. In performing such dual functions the invention employs the same instrumentalities which, so far as known, has not heretofore been accomplished. In the detection of ground faults, the present instrument operates to detect the weak electromagnetic field superposed on the faulty line by a very low voltage signal generator. When locating open line faults, the instrument will operate to detect the electrostatic field around the faulty line generator by any A. C. which may be carried therein and without the use of a signal generator or otherwise applied voltage, but in the case of open fault A. C. lines which are dead and with D. C. lines a signal generator will be used as with ground faults. In connection with the ability of the present instrument to equally detect ground and open faults, it should be pointed out that an important further feature is that the instrument enables the nature of the fault to be preliminarily determined at the start of the test prior to tracing the location of the fault. This is accomplished by making the instrument selectively responsive to electromagnetic and electrostatic fields. When responsive to each type of field it will not respond to the other type of field.

It has been found that an instrument having the necessary sensitivity for the purposes indicated may employ a single multiple-purpose electronic tube operating on miniature batteries and through an operating circuit employing a small number of compact parts. The entire unit may be housed within the confines of a cabinet having a capacity no greater than that of a small-sized radio receiver. No external antenna is required to pick up the field around the faulty lines. The pickup element is so designed that it may be housed within the cabinet with the other parts of the test instrument and the same is so arranged that it will selectively respond to electromagnetic and electrostatic fields. For certain purposes, as when the faulty wire is one of a large mass and for work around junction boxes, switchboards, etc., an extremely small auxiliary pickup element may be employed which can be inserted in very small spaces and which can be detachably connected to the test instrument by a flexible electric cable.

The above and other features and advantages of the invention will be understood by reference to the illustrative embodiment thereof in the accompanying drawings.

In such drawings,

Fig. 1 is a perspective view of a test instrument according to the invention;

Fig. 2 is a side elevation of the same instrument with one side removed to show the operating parts therein;

Fig. 3 is a diagrammatic view illustrating the use of the test instrument in conjunction with a signal generator in the location of a ground fault in an electric line;

Fig. 4 is a schematic diagram of the circuit arrangement employed in the test instrument shown in Figs. 1 to 3;

Fig. 5 is a schematic diagram of the parts in circuit of the signal generator shown in Fig. 3; and, Fig. 6 is a side elevation, partly in section, of an auxiliary field pickup device for special usage.

The test instrument as shown in Figs. 1 and 2 includes a relatively small cabinet 10 of non-metallic material, such as any conventional synthetic resin. A carrying handle is secured to the top thereof. The forward end portion of the cabinet is tapered to provide a rounded nose which can be inserted in small spaces when required. Such nose portion houses a field pickup element 13 comprising a coil of wire on an iron core. Such coil may, for example, comprise 10,000 turns of #38 wire.

The field detected by pickup 13 is imposed upon an electronic detector and single-stage audiofrequency amplifier circuit employing a combined detector and amplified vacuum tube 14 which outputs an amplified audio signal to a receiver 15 in the form of headphones which is detachably connected to the circuit through a jack switch 16 in the rear end of cabinet 10 and co-acting plug 17.

Vacuum tube 14 is of a type operating with low filament voltage furnished by a 1½-volt single-cell "A" battery 18 mounted by combined supporting and ground-conducting spring clips 19 and 20. The supply of filament voltage to the tube and the operation of the entire circuit is controlled by a manual switch 21 mounted in the rear end of cabinet 10. Plate voltage for tube 14 is supplied by a miniature 67½-volt "B" battery 22.

Nose portion 12 of the non-metallic cabinet 10 is free from metal shielding so as not to interfere with field detection by pickup 13. It is desirable that other elements of the electronic circuit be shielded against any type of electric pickup. Accordingly, compartment 23 of cabinet 10, in which they are located, is shielded by a metal liner 24.

Conveniently mounted on the nose 12 of the cabinet is a manual switch 25 through which pickup element 13 is selectively rendered responsive to electromagnetic and electrostatic fields as hereafter more fully explained.

For work in spaces where nose 12 of the cabinet cannot be accommodated, an auxiliary pickup device as shown in Fig. 6 may be employed in lieu of pickup element 13. Such device includes a relatively small pickup element 13' comprising a coil of wire on an iron core. The same may comprise somewhat less than half the turns of #38 wire as coil 13. While having considerably less sensitivity than element 13, it is intended for use in immediate proximity to the faulty wire under test where the field to be picked up is at its strongest. Element 13' is encased in the front end portion 26 of a relatively small carrying implement having a handle portion 27 angularly arranged to front portion 26. The implement may be of any suitable molded non-metallic material. Pickup element 13' is connected through a suitable flexible cable 50 with an elestric plug 28 detachably connectible into the circuit of the test instrument by jack switch 29 in the cabinet nose 12. Switch 29 is so arranged that when auxiliary pickup element 13' is operatively connected, main pickup element 13 is disconnected and rendered inoperative. Cable 50 is metal sheathed to prevent accidental pickup of interference by the cable. Arrangement is made for grounding the sheath, as by connecting it to a metal ring 51 on plug 28 which will contact a grounded ring 52, shown in Fig. 4, when the plug is inserted in switch 29.

The various operating parts of my electronic test instrument, including the auxiliary pickup 13', are shown in their wiring circuit in Fig. 4. Vacuum tube 14 is a combined detector and audio amplifier tube. Type 1D8GT tube is preferred because of its low operating voltage and other characteristics. It will be understood that other types of multiple-purpose detector amplifier tubes may be employed, and separate detector and amplifier tubes may also be employed with increased space requirements. The right-hand portion of the 1D8GT vacuum tube diagrammatically shown in Fig. 4 functions as a triode detector and includes a single input grid, cathode and plate. The left-hand portion of the tube functions as an audio amplifier and includes an input grid, two additional control grids and plate together with the cathode common to the two sides of the tube.

Field pickup coil 13 is connected across the tube detector input grid and filament and is shunted by a grid leak resistor 30 of about 18 megs. A fixed input condenser 31 is interposed between pickup 13 and the grid having a capacity of 250 mmfd. The position of condenser is desirable for the selective employment of the instrument in the detection of electromagnetic and electrostatic fields. The detector plate of the tube is connected with the plate battery 22 through plate resistor 32 of 10,000 ohms. The external circuit between the detector plate and the tube filament is completed by a biasing resistor 33 of 1,500 ohms shunted by a bypass condenser 34 of 0.2 mfd.

The detector plate is coupled to the control grid of the amplifier portion of the tube by a coupling condenser 35 of .02 mfd. A screen grid is coupled to the amplifier plate of the tube, and a suppressor grid connects with the filament. The plate voltage is supplied to the amplifier plate through plate load resistor 36 of a value of 5,000 ohms. The amplified output signal from the amplifier plate is delivered through condenser 37 of .05 mfd. to jack switch 16 and thence to phones 15.

The testing instrument which has been described may be used in connection with a portable low voltage signal generator 40 shown in Figs. 3 and 5 adapted to produce an intermittent signal which may readily be distinguished. Such generator may comprise a six volt dry cell battery 41, a spring biased relay switch arm 42 working between opposing switch contacts 43 and 44 and a solenoid 45 for actuating arm 42. Arm 42 is biased to engagement with contact 43 to which the energizing circuit for the solenoid is closed. When this occurs the solenoid draws arm 42 into brief contact with contact 43 through which the current is applied to the faulty line being tested. Solenoid 45 is simultaneously de-energized so that arm 42 is returned to engagement with contact 43. The cycle is repeated and a frequency depended upon the bias on arm 42. It is preferable that arm 42 be weighted to provide a relatively low frequency. The operation of the signal generator is controlled through a switch 46.

The signal generator just described is preferred since it can be embodied in a very small compact and light-weight portable unit. Instead of using an intermittent D. C. test signal a pulsating A. C. generator may be employed of any suitable voltage. The fault detecting test instrument will operate on any voltage strength signal.

In employing the fault detecting test instrument housed in cabinet 10 as heretofore described the signal generator 40 will first be connected to the faulty line to superpose a signal voltage thereon. An initial test can be made to determine whether the line fault is of grounded or open type by bringing the detecting instrument into proximity with the line and closing selector switch 25. A closed circuit will thus be established by pickup coil 13 to render the instrument responsive to an electromagnetic field. If the fault is a ground in the line the signal from the generator will be audible. If the fault is an open circuit the signal will not be audible with switch 25 closed. Switch 25 will thereupon be open to condition coil 13 to pickup an electrostatic field, and the signal from the generator should be audible with such setting in case of an open fault.

Once the nature of the fault has been determined the detecting instrument is carried along the line until the point of fault, indicated at X, in Fig. 3, has been located. Beyond the point of fault a signal will not be received. While the signal generator can be used for locating both open and ground faults in a line open faults may also be located without such generator where the line carries A. C. or pulsating D. C. through the electrostatic field set up thereby around the line.

The auxiliary small pickup 13' may be used under crowded conditions as heretofore mentioned. When plugged to switch 29 the main pickup 13 is thrown out of circuit and switch 25 is selectively operative to provide a closed circuit through 13' for electromagnetic field pickup in the case of ground faults and for electrostatic field pickup in the case of open faults.

The embodiment of the invention shown and described is merely exemplary and the scope of the invention is to be determined from the appended claims.

I claim:

1. A testing instrument for locating faults in current carrying conductors through the detection of fields adjacent the conductors comprising an electronic receiver including a field pickup coil means capable of detecting both electromagnetic and electrostatic fields, a circuit interconnecting said coil means and the receiver and switch means in said connecting circuit rendering said receiver selectively responsive to electromagnetic and electrostatic fields detected by the pickup means.

2. A testing instrument for locating faults in current carrying conductors through the detection of fields adjacent the conductors comprising an electronic receiver including a detector circuit, a metallic cored field pickup coil and means selectively operative to shunt said coil across the detector circuit for the reception of electromagnetic fields and to connect said coil through single detecting connection of one end of the coil in the detector circuit for the reception of electrostatic fields.

3. A testing instrument for locating faults in current carrying conductors through the detection of fields adjacent the conductors comprising an electronic receiver including a vacuum tube detector having an input grid and cathode, a metallic cored field pickup coil and means for selectively shunting said coil across the grid and cathode and for single point connecting the coil to the grid.

4. A testing instrument for locating faults in current carrying conductors through the detection of fields adjacent the conductors comprising an electronic receiver including a vacuum tube detector having an input grid and cathode connected by a grid leak resistor, a metallic cored field pickup coil having one end connected to the grid through a condenser and means selectively operative to connect the other end of the coil to the cathode in shunt with the grid leak resistor.

5. A testing instrument for locating faults in current carrying conductors through the detection of fields adjacent the conductors comprising an electronic receiver including a vacuum tube detector having an input grid and cathode, a circuit between the grid and cathode, a metallic cored field pickup coil and selectively operative switch means operative to shunt said coil across the grid and cathode circuit, to single point connect the coil to said grid and to remove the coil from any connection with said circuit.

6. A testing instrument for locating faults in current carrying conductors through the detection of fields adjacent the conductors comprising a portable cabinet having a hollow tapering and transversely rounded end portion of non-metallic material, a cylindrical metallic cored field pickup coil located in said cabinet end portion and fitting the rounded contour thereof and an electronic receiver located in the cabinet beyond said end portion and operatively connected to the pickup coil.

7. A testing instrument for locating faults in current carrying conductors through the detection of fields adjacent the conductors comprising a portable cabinet, an electronic receiver located in the cabinet and including a vacuum tube detector having a grid and cathode, a metallic cored field pickup coil also located in the cabinet and switch means for selectively connecting the pickup coil in shunt with the detector tube grid and cathode and in single point connection with the grid.

8. A testing instrument for locating open faults in current carrying conductors through the detection of an electrostatic field adjacent the conductors comprising a portable cabinet, an electronic receiver housed in the cabinet and including a vacuum tube detector having an input grid, and a field pickup coil having a single point connection through one end thereof with the tube grid and adapting the receiver to detect electrostatic fields, said field pickup coil being housed in one end of the cabinet.

References Cited in the file of this patent

UNITED STATES PATENTS

| Number | Name | Date |
|---|---|---|
| 400,182 | Bentley | Mar. 26, 1889 |
| 1,523,398 | Ceccarini | Jan. 20, 1925 |
| 1,745,419 | Henneberger | Feb. 4, 1930 |
| 2,103,179 | Rannau | Dec. 21, 1937 |
| 2,109,189 | Bly | Feb. 22, 1938 |
| 2,142,304 | Cummings | Jan. 3, 1939 |
| 2,148,641 | Reich | Feb. 28, 1939 |
| 2,167,490 | Ryan | July 25, 1939 |
| 2,249,166 | Parker et al. | July 15, 1941 |
| 2,321,355 | Berman | June 8, 1943 |
| 2,338,245 | Hays | Jan. 4, 1944 |
| 2,351,944 | Engler | June 20, 1944 |
| 2,442,805 | Gilson | June 8, 1948 |
| 2,459,174 | McFarland, et al. | Jan. 18, 1949 |
| 2,494,206 | Ross | Jan. 10, 1950 |